(12) United States Patent
Alumbaugh et al.

(10) Patent No.: US 7,400,977 B2
(45) Date of Patent: Jul. 15, 2008

(54) COMPUTING VALUES FOR SURVEYING A SUBTERRANEAN STRUCTURE BASED ON MEASUREMENTS ACCORDING TO DIFFERENT ELECTROMAGNETIC SURVEY TECHNIQUES

(75) Inventors: David Alumbaugh, Berkeley, CA (US); Jiuping Chen, Albany, CA (US); Huntly F. Morrison, Berkeley, CA (US)

(73) Assignee: Schlumberger Technology Corporation, Sugarland, TX (US)

( * ) Notice: Subject to any disclaimer, the term of this patent is extended or adjusted under 35 U.S.C. 154(b) by 0 days.

(21) Appl. No.: 11/548,905

(22) Filed: Oct. 12, 2006

(65) Prior Publication Data

US 2008/0091356 A1    Apr. 17, 2008

(51) Int. Cl.
G01V 3/12    (2006.01)
G01V 3/38    (2006.01)
G01V 3/15    (2006.01)
G01V 3/17    (2006.01)

(52) U.S. Cl. ............................................. 702/7
(58) Field of Classification Search .................. 702/2, 702/6, 7, 14, 16, 17, 18
See application file for complete search history.

(56) References Cited

U.S. PATENT DOCUMENTS

| 4,617,518 | A | 10/1986 | Srnka | |
|---|---|---|---|---|
| 4,633,182 | A | 12/1986 | Dzwinel | |
| 7,126,338 | B2 * | 10/2006 | MacGregor et al. | 324/334 |
| 2005/0077902 | A1 * | 4/2005 | MacGregor et al. | 324/334 |
| 2006/0129322 | A1 * | 6/2006 | MacGregor et al. | 702/13 |
| 2006/0186887 | A1 * | 8/2006 | Strack et al. | 324/336 |
| 2006/0203613 | A1 * | 9/2006 | Thomsen et al. | 367/38 |

FOREIGN PATENT DOCUMENTS

| GB | 2070345 | 9/1981 |
|---|---|---|
| GB | 2411006 | 8/2005 |
| WO | WO0214906 | 2/2002 |
| WO | WO03100467 | 12/2003 |
| WO | WO2004109338 | 12/2004 |
| WO | WO2005010560 | 3/2005 |

OTHER PUBLICATIONS

Bannister, P.R., New Simplified Formulas for ELF Subsurface-to-Subsurface Propagation, 1984, pp. 154-163, IEEE Journal of Ocean Engineering, vol. OE-9, No. 3.

Boerner, David E. et al., Orthogonality in CSAMT and MT Measurements, Geophysics, vol. 58, No. 7, Jul. 1993, pp. 924-934.

Chave, Alan D. et al., Controlled Electromagnetic Sources for Measuring Electrical Conductivity Beneath the Oceans, Journal of Geophysical Research, vol. 87, No. B7, pp. 5327-5338, Jul. 10, 1982.

(Continued)

Primary Examiner—Donald McElheny, Jr.
(74) Attorney, Agent, or Firm—Liangang (Mark) Ye; Jeffrey E. Griffin

(57) ABSTRACT

To survey a subterranean structure, first measurement data according to a first electromagnetic survey technique and second measurement data according to a second, different electromagnetic survey technique are received. An output value for surveying the subterranean structure is computed based on the first and second measurement data.

19 Claims, 6 Drawing Sheets

OTHER PUBLICATIONS

Chave, Alan D. et al., Electrical Exploration Methods in Applied Geophysics vol. 2, Electrical Exploration Methods for the Seafloor, Chapter 12, 1991, pp. 931-966.

Constable, S. et al., Marine Controlled-Source Electromagnetic Sounding, Journal of Geophysical Research, vol. 101, No. B3, Mar. 10, 1996, pp. 5519-5530.

Constable, S. et al., Occam's Inversion: A Practical Algorithm for Generating Smooth Models from Electromagnetic Sounding Data, Geophysics, vol. 52, No. 3, Mar. 1987, pp. 289-300.

Edwards, R. Nigel, On the Resource Evaluation of Marine Gas Hydrate Deposits Using Sea-Floor Transient Electric Dipole-Dipole Methods, Geophysics vol. 62, No. 1, Jan.-Feb. 1997, pp. 63-74.

Edwards, R.N., Controlled Source Electromagnetic Mapping of the Crust, Encyclopedia of Solid Earth Geopysics, ed. James D. Van Nostrand Reinhold, New York, 1989, pp. 127-138.

Yuan, J. et al., Electromagnetic Assessment of Offshore Methane Hydrate Deposits on the Cascadia Margin, American Geophysical Union Fall Meeting, San Francisco, 1998, pp. 363-375.

Kearey, Philip, The Encyclopedia of the Solid Earth Sciences, Blackwell Scientific Publications, 1993.

Evans, Rob L. et al., On the Electrical Nature of the Axial Melt Zone at 13 Degrees N on the East Pacific Rise, Journal of Geophysical Research, vol. 99, No. B1, Jan. 10, 1994, pp. 577-588.

Flosadottir, A. et al., Marine Controlled-Source Electromagnetic Sounding, Journal of Geophysical Research, vol. 101, No. B3, Mar. 10, 1996, pp. 5507-5517.

U.S. Dept. of Energy Office of Basic Energy Sciences, Division of Engineering and Geosciences, Two and Three-Dimensional Magnetotelluric Inversion, Technical Report: Dec. 1, 1991-May 31, 1994.

Grant, I.S. et al., Electromagnetism, Second Edition, John Wiley & Sons, 1990.

Kaufman, A. et al., Methods in Geochemistry and Geophysics, 16, 1990.

Kvenvolden, K. et al., A Primer on the Geological Occurrence of Gas Hydrate, Gas Hydrates: Relevance to World Margin Stability and Climate Change, Geological Society, London, Special Publications, 137, 9-30, 1998.

MacGregor, L. et al., The RAMESSES Experiment—III. Controlled-Source Electromagnetic Sounding of the Reykjanes Ridge.., Geophys. J. Int. 1998, 135, pp. 773-789.

MacGregor, L. et al., Use of Marine Controlled Source Electromagnetic Sounding for Sub-Basalt Exploration, EAGE 61st Conference and Technical Exhibition, Helsinki, Finland, Jun. 7-11, 1999.

Nekut, A. et al., Petroleum Exploration Using Controlled-Source Electromagnetic Methods, Proceedings of the IEEE, vol. 77, No. 2, Feb. 1989.

Sinha, M. C. et al., Evidence for Accumulated Melt Beneath the Slow-Spreading Mid-Atlantic Ridge, Phil. Trans. R. Soc. Land. A, 355, 1997, pp. 233-253.

Sinha, Martin, Controlled Source EM Sounding: Survey Design Considerations for Hydrocarbon Applications, LITHOS Science Report Apr. 1999, 1, 95-101.

Sinha, M. et al., An Active Source Electromagnetic Sounding System for Marine Use, Marine Geophysical Researches 1990, 12: 59-68.

Strack, K. et al., Integrating Long-Offset Transient Electromagnetic (LOTEM) with Seismics in an Exploration Environment, Geophysical Prospecting, 1996, 44, 997-1017.

Tseng, H. et al., A Borehole-to-Surface Electromagnetic Survey, Geophysics vol. 63, No. 5, pp. 1565-1572, 1996.

Das, Umesh C., Apparent Resistivity Curves in Controlled-Source Electromagnetic Sounding Directly Reflecting True Resistivities in a Layered Earth, Geophysics vol. 60, No. 1, Jan.-Feb. 1995, pp. 53-60.

Das, Umesh C., Frequency- and Time-Domain Electromagnetic Responses of Layered Earth-A Multiseparation, Multisystem Approach, Geophysics vol. 60, No. 1, Jan.-Feb. 1995, pp. 285-290.

Thompson, Arthur H. et al., U.S. Statutory Invention Registration H1490, Sep. 5, 1995.

Walker, Peter W. et al., Parametric Estimators for Current Excitation on a Thin Plate, Geophysics vol. 57, No. 6, Jun. 1992, pp. 766-773.

Ward, S.H. et al., Electromagnetic Theory for Geophysical Applications, in Investigations in Geophysics: Electromagnetic Methods in Applied Geophysics, ed. Nabighian, Society of Exploration Geophysicists, Oklahoma, 1988.

Yuan, J. et al., The Assessment of Marine Gas Hydrates through Electrical Remote Sounding: Hydrate without a BSR?, Geophysical Research Letters, vol. 27, Aug. 2000, pp. 2397-2400.

Yuan, Edwards et al., Electromagnetic Assessment of Offshore Methane Hydrate Deposits on the Cascadia Margin, Marelec 1999.

Maurer, Hansruedi et al., Optimized Design of Geophysical Experiments, SEG Paper, 1997.

Grant, I.S. et al., Electromagnetic Waves, Chapter 11, pp. 365-407, 1997.

* cited by examiner

US 7,400,977 B2

COMPUTING VALUES FOR SURVEYING A SUBTERRANEAN STRUCTURE BASED ON MEASUREMENTS ACCORDING TO DIFFERENT ELECTROMAGNETIC SURVEY TECHNIQUES

TECHNICAL FIELD

The invention relates generally to computing values for surveying a subterranean structure based on measurements received according to different electromagnetic survey techniques (such as a magnetotelluric survey technique and a controlled source electromagnetic survey technique).

BACKGROUND

Various electromagnetic techniques exist to perform surveys of subterranean structures underneath a surface for identifying structures of interest. Examples of structures of interest in the subterranean structure include subsurface resistive bodies, such as oil-bearing reservoirs, gas injection zones, and fresh-water aquifers. One survey technique is the magnetotelluric (MT) survey technique that employs time measurements of electric and magnetic fields (which are responsive to naturally occurring electromagnetic fields) for determining the electrical conductivity distribution beneath the surface. Another survey technique is the controlled source electromagnetic (CSEM) survey technique, in which an electromagnetic transmitter is used to generate electromagnetic signals. With either survey technique, surveying units (or receivers) containing electric and magnetic field sensors are deployed on a surface within an area of interest to make measurements from which a geological survey of the subterranean structure underneath the surface can be derived.

A shortcoming of MT survey techniques is that they are relatively insensitive to thin resistive layers that are typically present in subterranean structures. A thin resistive layer can be a thin (in the vertical direction) reservoir of oil, gas, or fresh water.

Conventional CSEM survey techniques are limited by the so-called air-wave problem, which prevents effective use of the CSEM survey techniques in shallow water applications. In a subsea environment, the air-wave problem is caused by a component of the electromagnetic signal that is generated by the source (the CSEM electromagnetic transmitter), which component can be thought of as following a path upwards from the transmitter to the sea surface, horizontally through the air, and then back down through the sea water to receivers (usually located on a seabed). In deep water applications, the air-wave component does not present a major issue, since the air-wave component is attenuated significantly as the air-wave component passes through the sea water. However, in a shallow water application, the air-wave component is not attenuated as much, so that the air-wave component may dominate the signals that are received by the receiver located at the seabed. In such a scenario, the measurements made by receivers used in a CSEM survey technique would not produce very useful information for the purpose of determining whether a resistive body is located in the subterranean structure.

On land, the air-wave problem is caused by electromagnetic signals propagating from a CSEM electromagnetic transmitter laterally through the air along the air-land interface to receivers. These air-wave electromagnetic signals propagating parallel to the land surface are insensitive to subsurface structures; therefore, such air-wave electromagnetic signals (which are received by the receivers) may interfere with proper detection of resistive objects in a subterranean structure.

SUMMARY

In general, according to an embodiment, methods and apparatus are provided for surveying a subterranean structure in which the following measurement data is received; first measurement data according to a first electromagnetic survey technique, and second measurement data according to a second, different electromagnetic survey technique. An output value for surveying the subterranean structure is computed based on the first and second measurement data.

According to another embodiment, a first value is derived based on first measurement data that represents a response due to naturally occurring electromagnetic fields. The first value is combined with a second value that is based on second measurement data that is subject to the air-wave effect. A field value is derived that represents a field induced by the air-wave effect.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
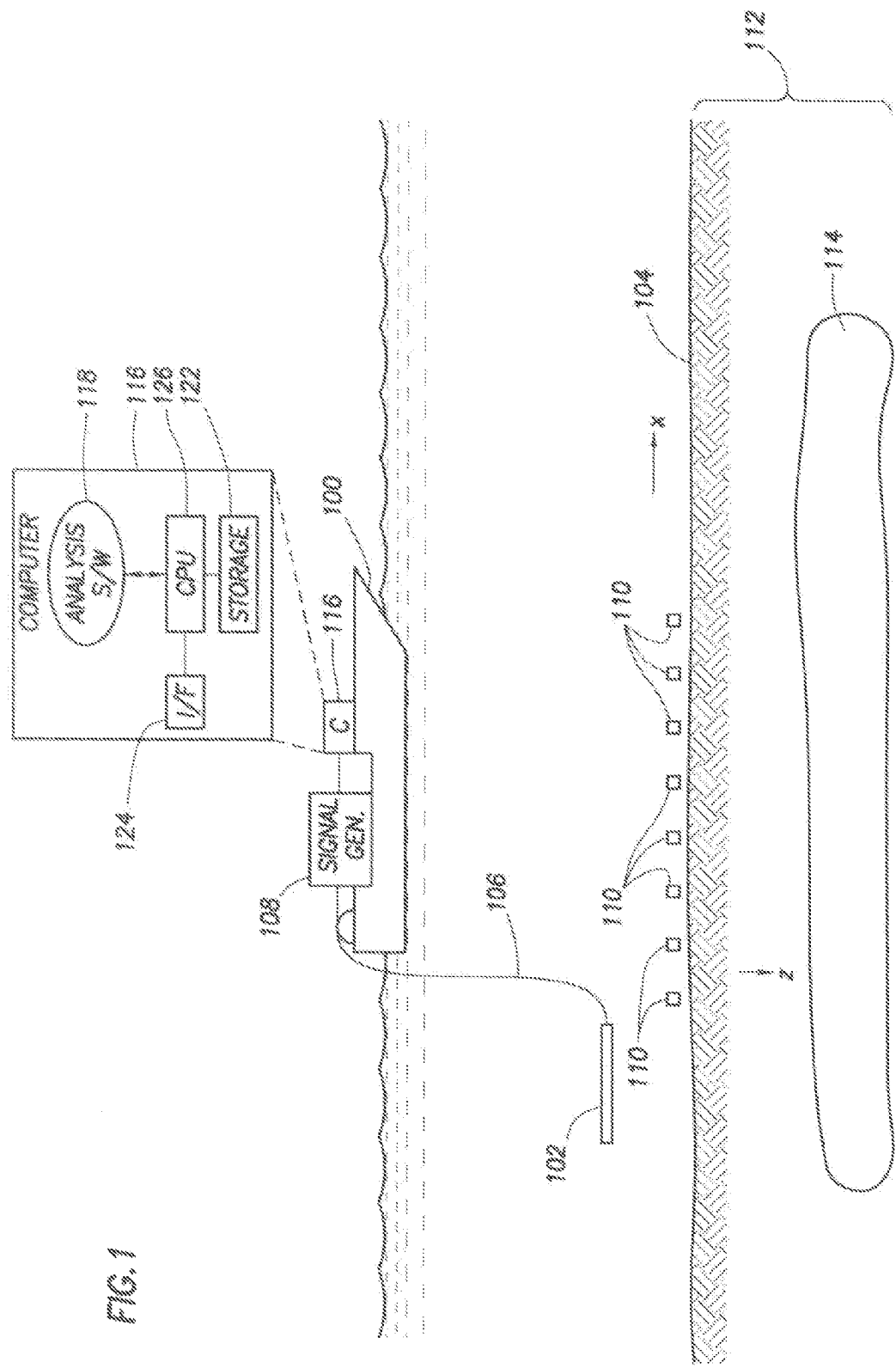
FIG. 1 schematically illustrates an example arrangement for performing a survey of a subterranean structure underneath a seabed in a subsea or marine environment, in accordance with an embodiment.

FIG. 1 illustrates an example arrangement for performing a survey of a subterranean structure in a subsea environment, in accordance with an embodiment. As will be described in further detail below, the subterranean structure surveying performed in accordance with some embodiments uses measurements received according to both the magnetotelluric (MT) survey technique and the controlled source electromagnetic (CSEM) survey technique, which are two different types of electromagnetic (EM) survey techniques. With the MT survey technique, a receiver measures signals that are responsive to EM fields generated naturally, such as within the earth's upper atmosphere. With the CSEM survey technique, an EM transmitter (102 in FIG. 1) generates EM signals that propagate or diffuse through various layers, including the sea water and layers in the subterranean structure, which EM signals are reflected by the subterranean layers back up to the receiver located on the surface (in this case the seabed or sea floor 104). In FIG. 1, receivers are depicted as sensor modules 110 located on or near the seabed 104.

If a target body of interest is a thin resistive layer (e.g., a thin layer containing hydrocarbons such as oil and gas, or an aquifer containing fresh water), then MT measurements (measurements made using the MT survey technique) are insensitive to the presence of the thin resistive layer. Naturally occurring EM fields excite predominantly horizontal current flows in the earth, which makes the MT survey technique intrinsically insensitive to thin resistive layers located in the subterranean structure. On the other hand, EM fields measured using the CSEM technique are sensitive to the presence of a thin resistive layer in the subterranean structure. However, as discussed above, the CSEM survey technique is sensitive to air-wave effects, especially on land or in shallow-water environments. If the air-wave effect dominates (in other words, EM signals induced by the air-wave effect are relatively strong when compared to EM signals reflected from subterranean layers), then accurate detection of a resistive layers may not be achievable. Note that EM signals induced by the air-wave effect are insensitive to subterranean layers.

In accordance with some embodiments, the air-wave effect can be removed by performing the survey of the subterranean structure using both measurements according to the MT survey technique and measurements according to the CSEM technique. The air-wave effect is estimated based on measurements taken using the MT survey technique. The estimated air-wave effect can then be removed from the measurements taken using the CSEM survey technique to produce an output value that can be used for more accurately determining the presence of thin resistive layers in the subterranean structure.

More generally, subterranean surveying according to some embodiments uses measurements taken according to two different survey techniques. Measurements according to a first survey technique are used to estimate an air-wave effect. Notably, the measurements according to the first survey technique are insensitive to presence of thin resistive layers in the subterranean structure being surveyed. The estimated air-wave effect is then removed from measurement taken using a second survey technique to produce output value(s) that can be used to detect whether a target resistive body is present in the subterranean structure. Note that measurements taken using the second survey technique are sensitive to the presence of thin resistive layers in the subterranean structure.

As further depicted in the subsea arrangement of FIG. 1, a sea vessel 100 is capable of towing the EM transmitter 102 in sea water. The EM transmitter 102 is an electrical dipole in one example embodiment. Typically, the EM transmitter 102 is arranged a relatively short distance above the seabed 104. As examples, the relatively short distance of the transmitter 102 above the seabed 104 can be 50 meters or less. Although only one EM transmitter 102 is depicted, it is contemplated that alternative embodiments may use two or more EM transmitters 102.

The EM transmitter 102 is coupled by a cable 106 to a signal generator 108 on the sea vessel 100. Alternatively, the signal generator 108 can be contained within the EM transmitter 102. The signal generator 108 controls the frequency and magnitude of the EM signal generated by the transmitter 102.

In one embodiment, a plurality of sensor modules 110 are arranged on the seabed 104 in a row (in a direction depicted as x). In other embodiments, the sensor modules 110 can have other arrangements (such as an array of sensor modules or some random arrangement of sensor modules). Each sensor module 110 includes various sensors, including electric field sensors and magnetic field sensors for making electric field measurements and magnetic field measurements, respectively.

The sensor modules 110 are used for taking both MT and CSEM measurements. To take an MT measurement, the CSEM transmitter 102 can either be turned off or can be located a far distance away from the respective sensor module 110. By locating the CSEM transmitter 102 a large distance away from the sensor modules 110, the CSEM signals would be weaker than the naturally occurring EM signals used for MT measurements. The MT measurements and CSEM measurements are combinable to produce an output value with the air-wave effect removed to enable accurate detection of a thin resistive body in the subterranean structure.

Each of the sensor modules 110 includes a storage device for storing measurements made by the various sensors, including electric field and magnetic field sensors, in the sensor module 110. The stored measurement data is retrieved at a later time when the sensor modules 110 are retrieved to the sea vessel 100. The retrieved measurement data can be uploaded to a computer 116 on the sea vessel 100, which computer 116 has analysis software 118 capable of analyzing the measurement data for the purpose of creating a map of the subterranean structure 112. The analysis software 118 in the computer 116 is executable on a central processing unit (CPU) 120 (or plural CPUs), which is coupled to a storage 122. An interface 124 that is coupled to the CPU 120 is provided to allow communication between the computer 116 and an external device. For example, the external device may be a removable storage device containing measurement data measured by the sensor modules 110. Alternatively, the interface 124 can be coupled to a communications device for enabling communications of measurement data between the computer 116 and the sensor modules 110, where the communications can be wired communications or wireless communications. The wired or wireless communications can be performed when the sensor modules 110 have been retrieved to the sea vessel 100. Alternatively, the wired or wireless communications can be performed while the sensor modules 110 remain on the sea floor 104.

Alternatively, instead of providing the computer 116 (and the analysis software 118) on the sea vessel 100, the computer 116 can instead be located at a remote location (e.g., at a land location). The measurement data from the sensor modules 110 can be communicated by a wireless link (e.g., satellite link) from the sea vessel 100 to the remote location. In yet another alternative, each sensor module 110 can include processing circuitry to process the measurement data and derive electric field values in accordance with some embodiments.

Figure 2:
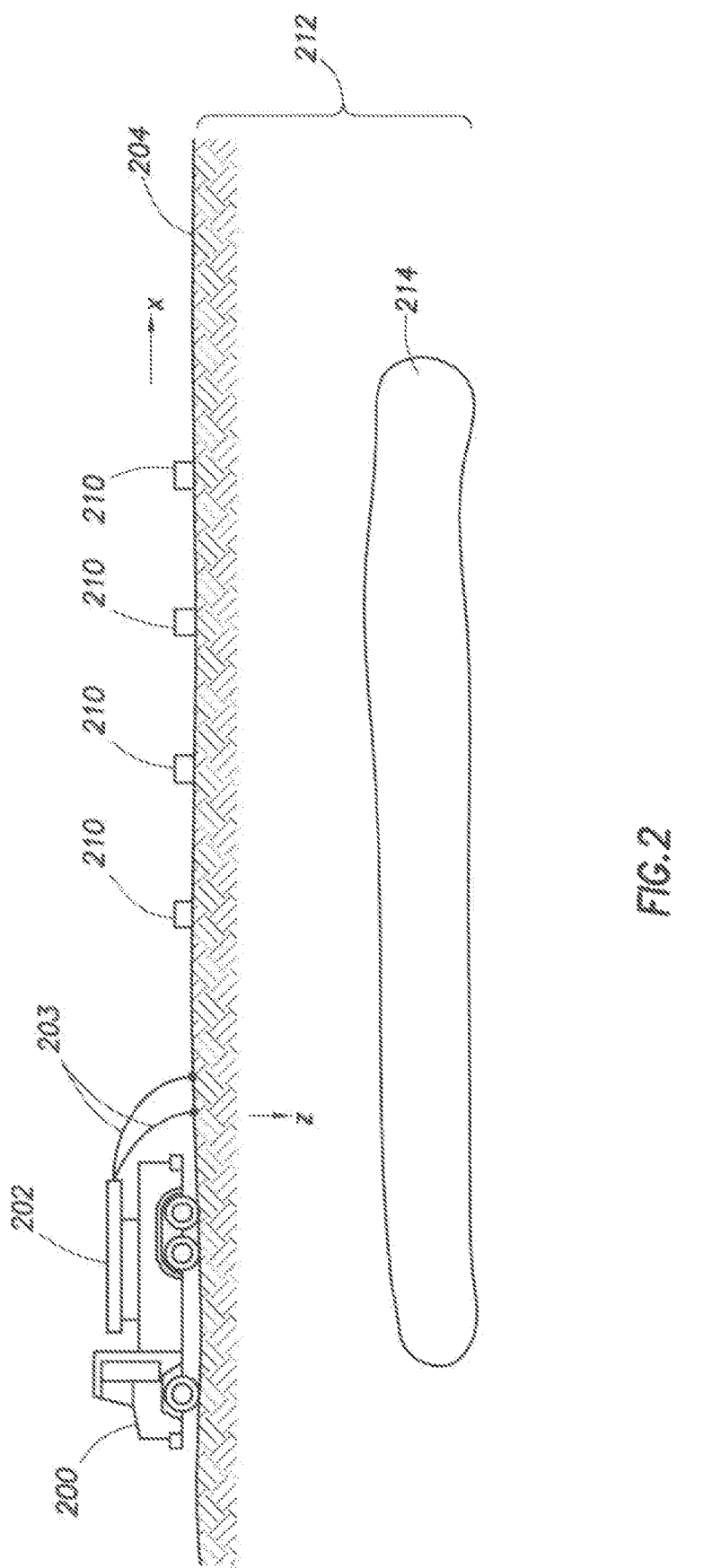
FIG. 2 schematically illustrates an example arrangement for performing a survey of a subterranean structure underneath an earth surface in a land-based application, in accordance with another embodiment.

FIG. 2 shows an example arrangement for a land-based application, where a CSEM transmitter 202 can be carried on a vehicle 200 (with wires 203 attached to the CSEM transmitter 202 to provide grounding to the earth). Alternatively, the transmitter 202 can be placed on the land surface 204. A row of sensor modules 210, identical to sensors modules 110 of FIG. 1, are provided. As is the case with the subsea application, the sensor modules 210 are able to take both MT measurements and CSEM measurements such that the air-wave effect can be reduced or eliminated. In a land-based application, the air-wave component simply propagates along the air-earth interface straight from the transmitter 202 to each sensor module 210, with very little attenuation. Thus, the air-wave problem for land-based applications can be worse than the air-wave problem for subsea applications.

A computer (not shown) similar to the computer 116 of FIG. 1 can be used to process measurements taken by the sensor modules 210 for the purpose of performing a survey of a subterranean structure 212 underneath the land surface 204. Using the measurements from the sensor modules 210, a target body 214 of interest, such as a thin resistive layer containing hydrocarbons or fresh water, can be accurately identified.

Figure 3:
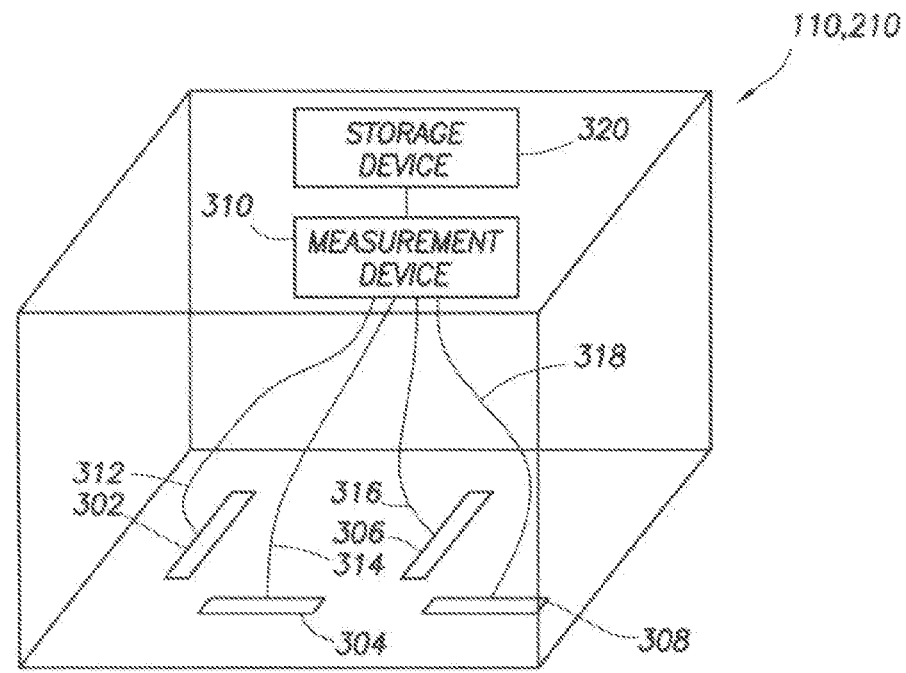
FIG. 3 illustrates a sensor module used in the arrangement of FIG. 1 or 2, according to an embodiment.

FIG. 3 shows an example sensor module 110 or 210. The sensor module has a pair of perpendicularly arranged electric field sensors 302 and 304, and a pair of perpendicularly arranged magnetic field sensors 306 and 308. The electric field sensors 302, 304 generally lie in a horizontal plane to measure horizontal electric fields. Similarly, the magnetic field sensors 306, 308 lie generally in a horizontal plane to measure horizontal magnetic fields, If the sensor module 110, 210 is perfectly aligned in direction x (see FIGS. 1 and 2), then the sensors 304 and 308 lie in the x direction, and the sensors 302 and 306 lie in a y direction, where y is perpendicular to the x direction in the horizontal plane. However, as typically would be the case, deployed sensor modules do not usually align perfectly in the x,y directions, so that the sensors 302, 304, 306, 308 would be at some angular offsets with respect to the x, y directions. In such scenarios, mathematical calculations can be performed to rotate measured electric/magnetic fields to the x and y directions.

The measurements from the sensors 302, 304, 306, and 308 are provided to a measurement device 310 over respective wires 312, 314, 316, and 318. In some implementations, the measurement device 310 measures voltages provided by current flows in electrical wires 312, 314, 316, 318, which current flows are induced by corresponding electric fields and/or magnetic fields. The measured voltages are stored in a storage device 320 in the sensor module, where the stored data can be in the form of measured voltages, measured currents, measured magnetic field values, measured electric field values, and so forth. The measurement data stored in the storage device 320 is later processed by a computer, such as computer 116 in FIG. 1.

Each of the sensor modules 110, 210 depicted in FIGS. 1 and 2 provide measurement data (both CSEM measurement data and MT measurement data), where the measurement data corresponds to measurements at plural points along a line (row in direction x as depicted in FIGS. 1 and 2). The measurement data from the multiple sensor modules 110, 210 can then be combined to remove the air-wave effect.

In accordance with some embodiments, the air-wave effect is approximated by a plane wave at large offsets (an offset refers to distance between the transmitter 102, and a respective sensor module). In other words, the air-wave effect is approximated using measurements made by the sensor modules 110, 210 when the EM transmitter 102 is located a far distance (large offset) from each sensor module. Alternatively the air-wave effect is approximated using measurements made when the EM transmitter 102 is turned off.

According to some embodiments, the horizontal electric field generated by the air-wave effect (referred to as the "air-wave horizontal electric field") can be estimated by multiplying the MT impedance that is determined from the MT measurements by a horizontal CSEM magnetic field that is orthogonal to the CSEM electric field measurement. MT measurements refer to magnetic field and electric field measurements made by the sensors 302, 304, 306, 308 (FIG. 3) when the CSEM transmitter is off or located far away. The horizontal CSEM magnetic field refers to a magnetic field measured by one or both of the magnetic field sensors 306, 308; and the CSEM electric field refers to the electric field measured by one or both of the electric field sensors 302, 304.

The computed air-wave horizontal electric field is subtracted from the measured CSEM electric field to remove the air-wave effect, with the output of the subtraction representing an accurate response based on the subterranean structure 112, 212 underneath the surface.

Figure 4:
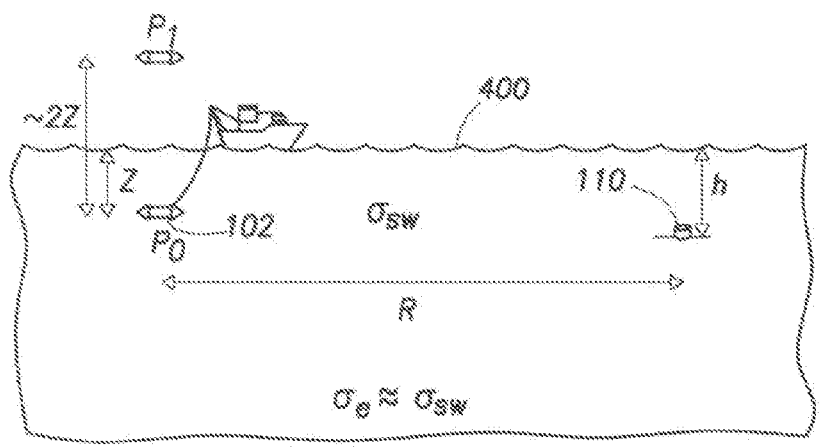
FIG. 4 illustrates relative spacings between components used in the arrangement of FIG. 1.
Figure 5:
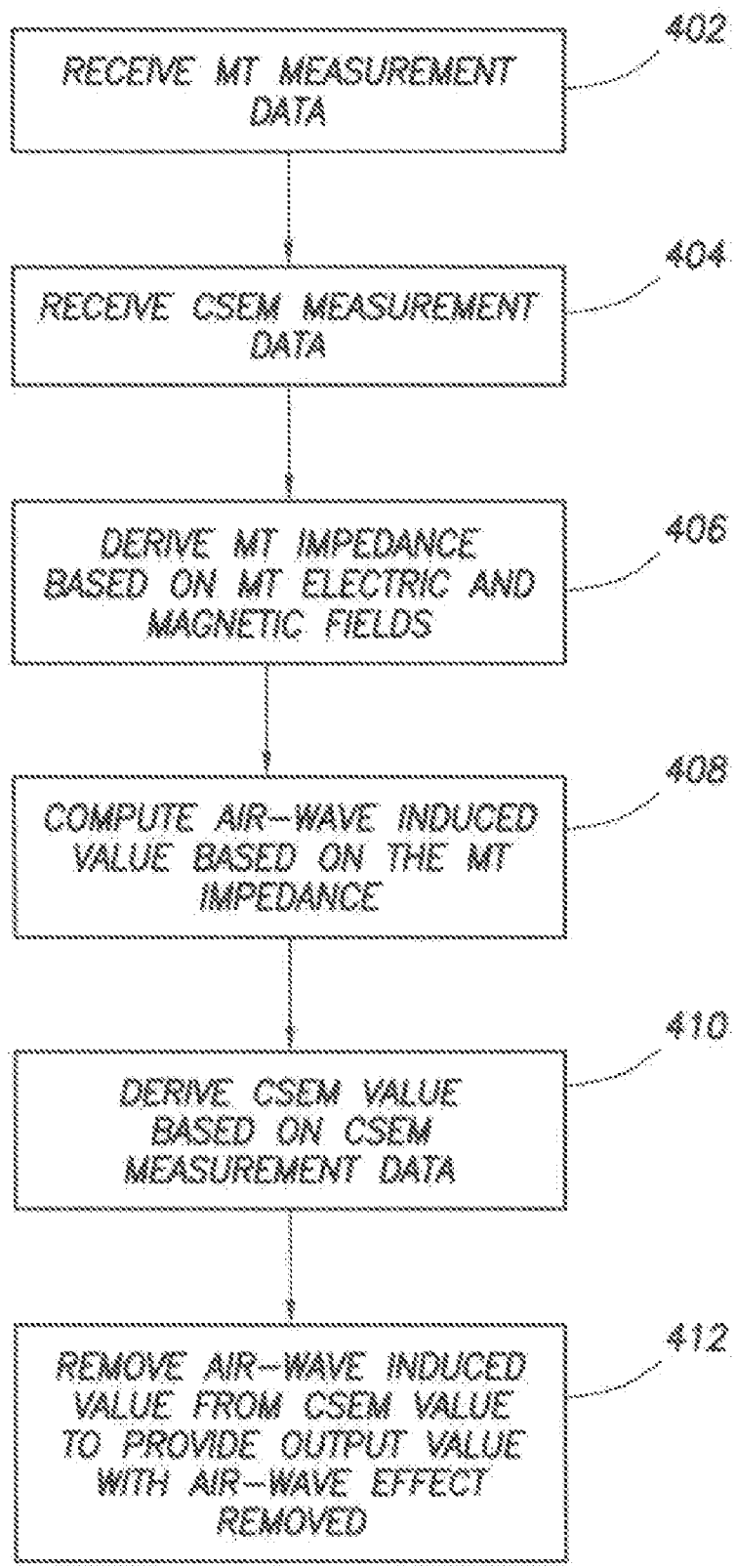
FIG. 5 is a flow diagram of the process of performing a subterranean structure survey, according to an embodiment.

FIG. 4 is a schematic diagram illustrating relative distances between various components in the subsea arrangement of FIG. 1. The transmitter 102 is located a vertical distance z below the sea surface 400. A sensor module 110 is located a vertical distance h below the sea surface 400. The lateral offset between the transmitter 102 and the sensor module 110 is a distance R. In an environment in which the conductivity of the subterranean structure is approximately the same as the electrical conductivity of sea water ($\sigma_e \approx \sigma_{sw}$, where $\sigma_e$ is the conductivity of the subterranean structure, and $\sigma_{sw}$ is the conductivity of sea water) if both the source depth z and the receiver depth h are smaller than the lateral separation R between the transmitter 102 and the sensor module as depicted in FIG. 4, then the electric and magnetic fields can be represented as:

$$E, H \approx P_0 + P_1 + L, \quad \text{(Eq. 1)}$$

where E represents the electric field, H represents the magnetic field $P_0$ represents the direct-wave response produced by a dipole source (transmitter 102) in the medium of uniform conductivity corresponding to that of the subterranean structure (in other words, the measured response when no resistive body is in the subterranean structure), $P_1$ represents a perturbation to the electric or magnetic field due to effect of the air-sea interface, and L is a lateral wave due to the air-wave effect.

A similar relationship can be expressed for the land-based application.

At larger offsets (between the transmitter and sensor modules) or when the transmitter is turned off, horizontal fields in the earth or sea water that are generated by the horizontally traveling lateral wave (which causes the air-wave effect) can be approximated by a vertically diffusing plane energy (which travels along direction z as depicted in FIGS. 1 and 2). The plane energy in the vertical direction travels through sea water and air and diffuses through layers of the subterranean structure. The vertically diffusing plane energy is essentially an EM energy diffusing in the vertical direction z. If the diffusion of the EM energy is purely vertical, then the electric and magnetic fields associated with the EM energy in the z direction are horizontal (in the x and y directions). In this scenario, the horizontal electric field in the x direction, is represented as $E_x^L$ is expresses as follows:

$$E_x^L = Z_{xy} \cdot H_x^L, \quad \text{(Eq. 2)}$$

where $E_x^L$ is the horizontal x-component of the lateral-wave-generated electric field, $H_x^L$ is the horizontal y-component of lateral-wave-generated magnetic field, and $Z_{xy}$ is the plane-wave-impedance of the medium. The "medium" refers to the medium in the subterranean structure 112, 212.

The impedance $Z_{xy}$ can be obtained by making measurements of naturally occurring plane-wave fields using the MT survey technique. As noted above, MT measurements can be taken by either shutting off the CSEM transmitter 102 or by placing the CSEM transmitter 102, 202 far away from a sensor module such that the signal generated by the CSEM transmitter 102, 202 has a magnitude below the magnitude of naturally occurring MT fields.

Using simplified theory, the MT impedance, $Z_{xy}^{MT}$, of the subterranean structure 112, 212 for a one-dimensional earth is defined as:

$$Z_{xy}^{MT} = E_x^{MT}(f)/H_y^{MT}(f), \qquad \text{(Eq. 3)}$$

where (f) designates an estimate of the MT impedance made at the specific frequency used in the CSEM survey. One-dimensional earth implies that the electrical properties only vary in the z direction (in other words as far as a sensor module can detect, the earth is made up of a series of uniform layers stacked on top of each other). A two-dimensional earth assumes that the earth varies in depth (z direction) as well as laterally in one direction. For example, the conductivity may vary in both the x and z directions, but would be invariant for constant z and x values along the y direction. A three-dimensional earth is the most general case in which earth properties vary in any direction.

Since the techniques according to some embodiments are most useful for detecting thin resistive layers in a subterranean structure, a one-dimensional earth is assumed. However, in other embodiments, the techniques described here can be extended for two-dimensional or three-dimensional earth assumptions.

If the lateral wave (or vertical plane energy) component is assumed to dominate the CSEM measurement, the plane-energy electric field can be estimated by multiplying the magnetic field measured in the CSEM survey by the MT determined impedance. In other words, the electric field that is generated by the lateral wave is estimated as:

$$E_x^L \approx Z_{xy}^{MT} \cdot H_y^{CSEM}. \qquad \text{(Eq. 4)}$$

Thus, the horizontal field $E_x^L$ induced by the air-wave effect is estimated using a value, $Z_{xy}^{MT}$, derived using measurements according to a survey technique (the MT survey technique) that is insensitive to presence of a thin resistive body in the subterranean structure. This estimation is possible because the air-wave response in CSEM measurement data is described by a vertically diffusing EM energy (in the z direction), and MT measurements measure only this type of response. Subtracting the $E_x^L$ term from the CSEM measured electric field defines a new output value, which is called the "scattered" electric field $E^{CSEM}$:

$$E_x^{scat} = E_x^{CSEM} - Z_{xy}^{MT} \cdot H_y^{CSEM}. \qquad \text{(Eq. 5)}$$

where $E_x^{CSEM}$ represents the electric field measured by the electric field of the sensor module in the x direction, and $H_y^{CSEM}$ represents the magnetic field in the y direction measured by the magnetic field sensors.

The scattered electric field $E^{scat}$ represents the electric field with the lateral wave electric field removed (in other words, the scattered electric field $E^{scat}$ represents the electric field derived from the measurements made by the sensor modules 110, 210 with the air-wave effect removed).

Note that the same process can be applied to remove the air-wave effects from the magnetic fields:

$$H_y^{scat} = H_y^{CSEM} - E_x^{CSEM}/Z_{xy}^{MT}, \qquad \text{(Eq. 6)}$$

where $H_y^{CSEM}$ represents the magnetic field with the lateral-wave-generated magnetic field $(H_y^L \approx E_x^{CSEM}/Z_{xy}^{MT})$ removed to remove the air-wave response. According to Eqs. 4-6, field values ($E_x^L$ or $H_y^L$) representing fields induced by the air-wave effect are derived by combining an impedance ($Z_{xy}^{MT}$) that is free of the air-wave effect with CSEM-measured field values ($H_y^{CSEM}$ or $E_x^{CSEM}$) that are subject to the air-wave effect.

Because the lateral wave-generated components (electric field or magnetic field components) in Eqs. 5 and 6 are being approximated with the total CSEM field measurements (e.g. $H_y^L$ based on $E_x^{CSEM}$ measurements and $E_y^L$ based on $H_y^{CSEM}$ measurements), the method of air-wave removal outlined in Eqs. 5 and 6 works best for those conditions where the CSEM measurements are dominated by the air-wave.

A similar operation for air-wave removal can be performed on the measured impedances themselves. In other words:

$$Z_{xy}^{scat} = Z_{xy}^{CSEM} - Z_{xy}^{MT}, \qquad \text{(Eq. 7)}$$

where $Z_{xy}^{CSEM} = E_x^{CSEM}/H_y^{CSEM}$. The impedance $Z_{xy}^{MT}$ represents the impedance with the air-wave effect removed. The use of the impedances rather than (electric or magnetic) field values in CSEM interpretation has the benefit of the impedance being independent of source amplitude and phase tracking problems, and is less susceptible to geometry errors associated with relative source and receiver positioning. In addition, there are no assumptions of the air-wave dominance in this expression (Eq. 7), and thus it can be used in deep water as well as shallow water.

In two-dimensional and three-dimensional earth environments, the MT measured impedance is a 2×2 tensor rather than scalar. For general three-dimensional earth, the tensor has the form In other words, z is assumed to lie diagonally in a horizontal direction that has an angular offset with respect to the x and y directions. In these cases, the MT impedance used in the expressions above (Eqs. 5-7) would be the corresponding off-diagonal components for an alignment that is consistent with that used for the CSEM data. This may involve rotation of the impedance tensor.

The above techniques assume that MT measurement data is taken in a present survey job. In alternative implementations, if no MT data were available but a numerical model existed that was constructed from other data (for example a previous MT survey or short-offset CSEM data where the air-wave effect is not a problem), the MT impedance could be estimated by using a modeling technique.

FIG. 4 shows a general flow according to some embodiments. MT measurement data is received (at 402) at each sensor module 110, 210. As noted above, the MT measurement data is received when the CSEM transmitter 102, 202 is far away from the sensor modules, or when the CSEM transmitter is turned off. Alternatively, task 402 can be skipped if MT measurements are not possible or not available.

CSEM measurement data is then received (at 404) by positioning the transmitter 102, 202 a closer distance to each sensor module 110, 210. Next, the MT impedance is derived (at 406) based on MT electric and magnetic fields, according to Eq. 3. The MT impedance is derived at a frequency at which the CSEM survey is expected to be performed. If MT measurement data is not available, then the MT impedance is estimated using a modeling technique.

Next, an air-wave induced value (which can be an electric field according to Eq. 4, a magnetic field according to Eq. 6, or the MT impedance itself according to Eq. 7) is composed (at 408) based on the MT impedance. A CSEM value is derived (at 410) based on the CSEM measurement data, where the CSEM value can be an electric field, $E_x^{CSEM}$, a magnetic field, $H_y^{CSEM}$; or an impedance, $Z_{xy}^{CSEM}$. The air-wave induced value (calculated at 408) is removed (such as by subtraction) from the CSEM value (computed at 410) to provide (at 412) an output value (e.g., $E_x^{MT}$, $H_y^{MT}$, or $Z_{xy}^{MT}$) with the air-wave effect removed.

In some embodiments, the output values from multiple sensor modules 110, 210 are used for determining whether a target resistive body exists in the subterranean structure. Alternatively, the output value from just one sensor module 110, 210 can be used for making this determination.

Figure 6B:
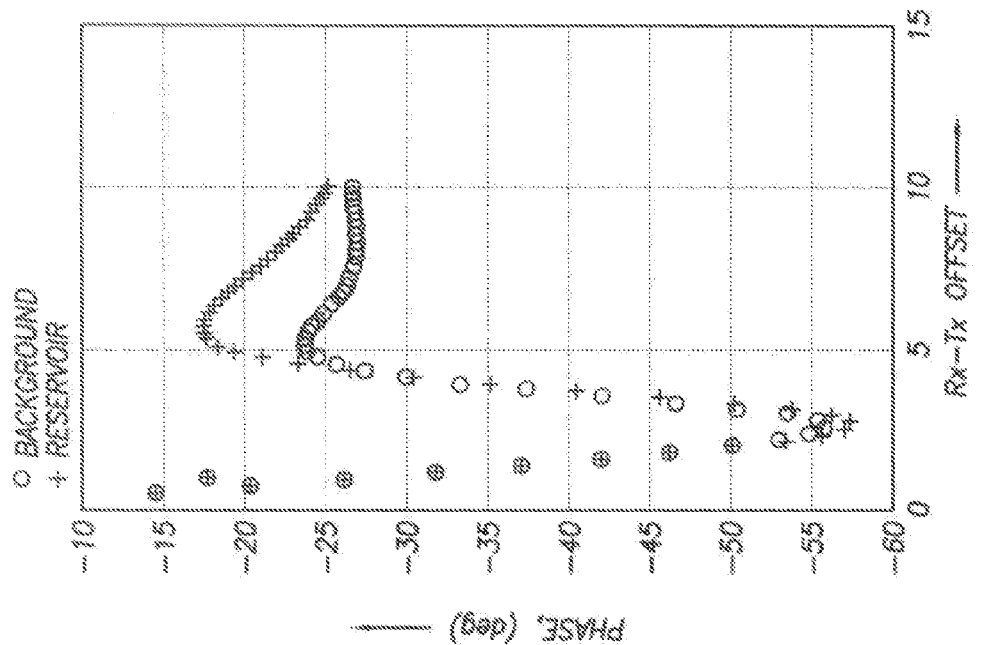
FIGS. 6A-6B are graphs of computed electromagnetic field values using a conventional survey mechanism in which an air-wave effect has not been removed.
Figure 6A:
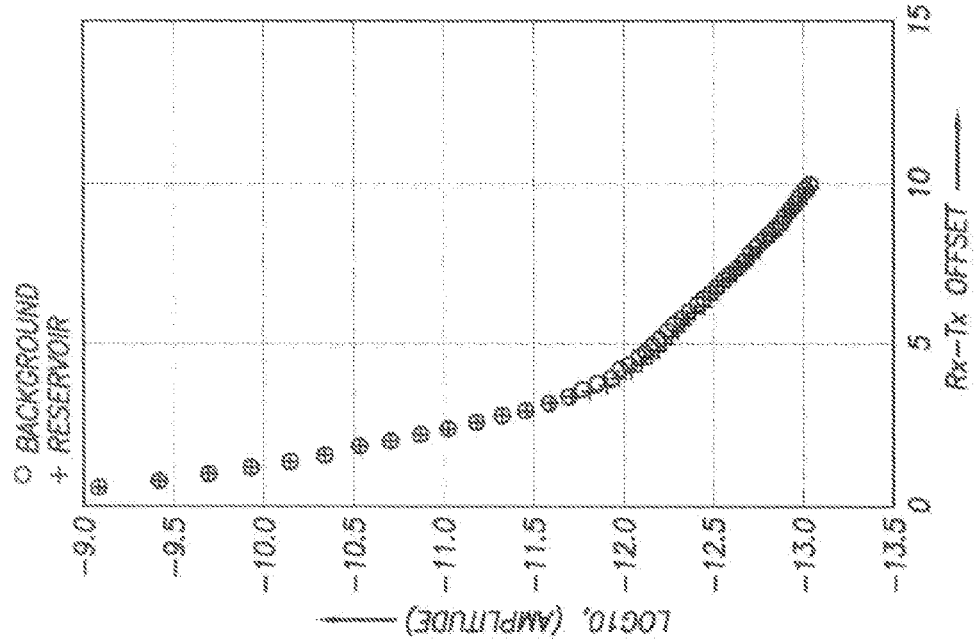

FIGS. 6A-6B are graphs illustrating the x-component of the electric field ($E_x$) measured using a CSEM survey technique where air-wave removal according to some embodiments is not performed. FIG. 6A shows the $\log_{10}$ amplitude of $E_x$, whereas FIG. 6B shows the phase of $E_y$. The horizontal axis of the graphs shows the offset between the transmitter and a sensor module. Note that the values in the horizontal and vertical axes of the graphs are provided for the purpose of example only. In each of FIGS. 6A and 6B, the curve represented by the "+" symbol shows the electric field with a target reservoir present in the subterranean structure, whereas the curve represented by the "o" symbol represents the electric field measured where the subterranean structure does not contain the resistive reservoir. As depicted in FIGS. 6A and 6B, since the air-wave effect dominates, an operator would not be able to accurately tell the difference between the two cases (one where the resistive body is present and the other where the resistive body is not present). In fact, in FIG. 6A, the amplitudes of $E_x$ for the two cases are almost the same at the various offsets.

Figure 7B:
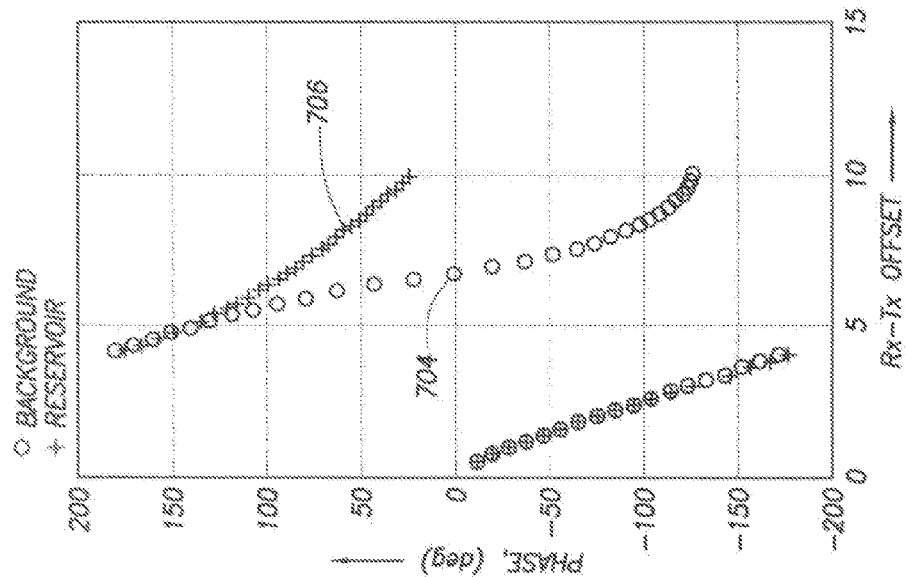
FIGS. 7A-7B are graphs of computed electromagnetic field values using a survey mechanism in which an air-wave effect has been removed, in accordance with an embodiment.
Figure 7A:
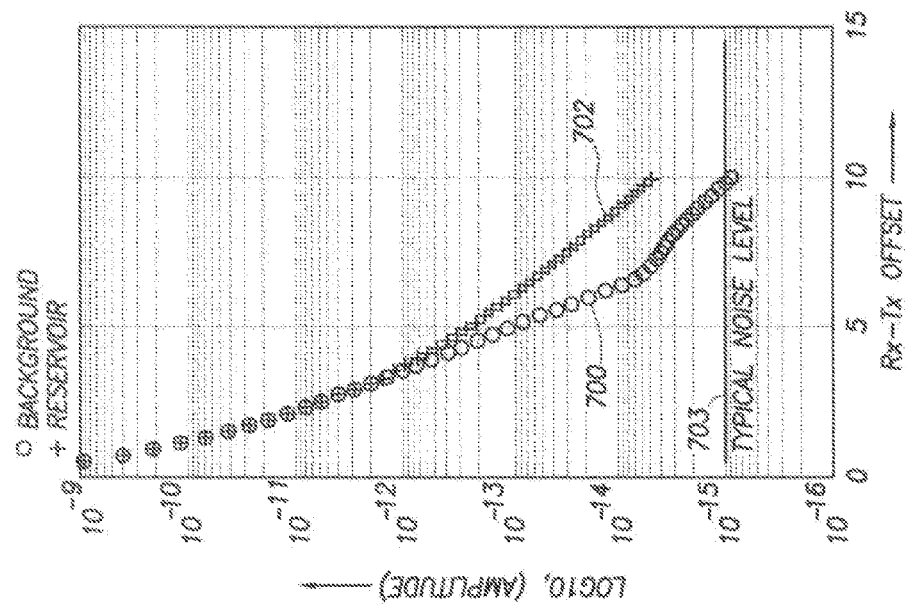

FIGS. 7A-7B show electric field values $E^{scat}$ (also in the x direction) with the air-wave effect removed. FIG. 7A shows a plot of the $\log_{10}$ amplitude versus the offset between the transmitter and sensor module, whereas FIG. 7B plots the phase of the electric field with respect to the offset between the transmitter and sensor module. In FIG. 7A, the curve 700 (indicated by the "o" symbol) represents $E^{scat}$ measured with no resistive body in the subterranean structure. The curve 702 (indicated by the "+" symbol) represents the amplitude of $E^{scat}$ with a resistive body present in the subterranean structure. Line 703 represents an example noise level. As can be seen in FIG. 7A, there is visible separation between curves 700 and 702 at certain offsets between the transmitter and sensor module, which would enable an operator to accurately distinguish between a subterranean structure that has a resistive body from a subterranean structure without such a resistive body.

Similarly, in FIG. 7B, separation between curve 704 (representing the phase of electric field measurements for a subterranean structure without a resistive reservoir) and curve 706 (which represents the phase of the electric field for a subterranean structure containing a resistive reservoir) exists at certain offsets between the transmitter and sensor module.

Instructions of software described above (including the analysis software 118 in FIG. 1) are loaded for execution on a processor (e.g., CPU 120 in FIG. 1). The processor includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices (such as storage 122 in FIG. 1), which are implemented as one or more machine-readable storage media. The storage media include different forms of memory including semiconductor memory devices such as dynamic or static random access memories (DRAMs or SRAMs), erasable and programmable read only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   receiving first measurement data according to a first electromagnetic survey technique;
   receiving second measurement data according to a second, different electromagnetic survey technique; and
   computing an output value for surveying a subterranean structure based on the first and second measurement data; the output value representing a field induced by an air wave effect.

2. The method of claim 1, wherein receiving the first measurement data is according to a magnetotelluric (MT) survey technique, and receiving the second measurement data is according to a controlled source electromagnetic (CSEM) survey technique.

3. The method of claim 1, further comprising:
   computing a first value based on the first measurement data, wherein the first measurement data is insensitive to presence of a thin resistive body in the subterranean structure;
   computing a second value based on the second measurement data, wherein the second measurement data is sensitive to presence of the thin resistive body in the subterranean structure; and
   wherein computing the output value comprises removing an effect of the first value from the second value.

4. The method of claim 3, wherein computing the first value comprises computing the first value that has a component representing an impedance of a medium through which an electromagnetic signal travels.

5. The method of claim 3, wherein computing the first value comprises computing an estimate of a field induced by an air-wave effect.

6. The method of claim 5, wherein computing the second value comprises computing a field generated in response to at least one electromagnetic signal transmitted from at least one transmitter.

7. The method of claim 6, wherein computing the output value comprises computing the output value with the air-wave effect removed.

8. The method of claim 1, wherein the first measurement data is insensitive to presence of a reservoir in the subterranean structure, and the second measurement data is sensitive to presence of the reservoir in the subterranean structure.

9. The method of claim 1, wherein computing the output value comprises computing one of an electric field value, a magnetic field value, and an impedance value.

10. A system comprising:
    a storage to store first measurement data that represents a response due to naturally occurring electromagnetic fields, and second measurement data that is subject to an air-wave effect; and
    a controller to:
    derive a first value based on the first measurement data;

combine the first value with a second value, the second value based on the second measurement data; and derive, based on combining the first and second values, a field value representing a field induced by the air-wave effect.

11. The system of claim 10, wherein the first value is derived by using the first measurement data taken with a magnetotelluric survey technique.

12. The system of claim 11, wherein the controller computes the second value based on the second measurement data taken with a controlled source electromagnetic (CSEM) survey technique.

13. The system of claim 10, wherein the field value represents one of an electric field and a magnetic field that is induced by the air-wave effect.

14. The system of claim 13, wherein the first value represents an impedance, and the second value represents one of a magnetic field and an electric field that is computed based on the second measurement data that is subject to the air-wave effect.

15. The system of claim 14, wherein the impedance is multiplied to the second value to derive the field value.

16. The system of claim 10, the controller to further compute an output value by subtracting the field value to remove the air-wave effect, wherein the output value represents one of an output electric field and output magnetic field without the air-wave effect.

17. A system comprising:

a storage to store first measurement data taken according to a first electromagnetic survey technique, and second measurement data taken according to a second, different electromagnetic survey technique; and a controller to compute an output value for surveying a subterranean structure based on the first and second measurement data; the output value representing a field induced by an air wave effect.

18. The system of claim 17, wherein the first electromagnetic survey technique comprises a magnetotelluric (MT) survey technique, and the second electromagnetic survey technique comprises a controlled source electromagnetic (CSEM) survey technique.

19. The system of claim 17, wherein the first measurement data is insensitive to presence of a reservoir in the subterranean structure, and the second measurement data is sensitive to presence of the reservoir in the subterranean structure.

* * * * *